United States Patent
Chang

(10) Patent No.: US 7,705,566 B2
(45) Date of Patent: Apr. 27, 2010

(54) CHARGER STRUCTURE WITH NORMAL AND BOOSTING CHARGE MODES

(75) Inventor: I-Chang Chang, Sijhih (TW)

(73) Assignee: Jye Chuang Electronic Co., Ltd., Taipei County (TW)

( * ) Notice: Subject to any disclaimer, the term of this patent is extended or adjusted under 35 U.S.C. 154(b) by 190 days.

(21) Appl. No.: 11/526,109

(22) Filed: Sep. 25, 2006

(65) Prior Publication Data

US 2008/0074085 A1 Mar. 27, 2008

(51) Int. Cl.
  *H02J 7/00* (2006.01)
(52) U.S. Cl. .......................... 320/160; 320/164; 320/107
(58) Field of Classification Search ................. 320/107, 320/162, 164, 160
  See application file for complete search history.

(56) References Cited

U.S. PATENT DOCUMENTS

| 4,710,694 A | * | 12/1987 | Sutphin et al. | ............... 320/139 |
| 5,296,797 A | * | 3/1994 | Bartlett | ....................... 320/145 |
| 6,107,782 A | * | 8/2000 | Imai et al. | .................... 320/150 |
| 2004/0169489 A1 | * | 9/2004 | Hobbs | ......................... 320/104 |
| 2006/0192531 A1 | * | 8/2006 | Nishida | ...................... 320/128 |

* cited by examiner

*Primary Examiner*—Edward Tso
*Assistant Examiner*—Aaron Piggush
(74) *Attorney, Agent, or Firm*—Muncy, Geissler, Olds & Lowe, PLLC

(57) ABSTRACT

A charger device is configured with electric conducting devices corresponding to electric conducting contact points of a battery. The electric conducting contact points are correspondingly associated with the charger device, a detector device and an automatic switching device. When the charger device is connected to the battery, the detector device determines size of charge current, and when the detector device determines that the charge current has not reached a set value, then the automatic switching device switches a normal charge mode to a boosting charge mode. The detector device stops the charger device from charging if the battery has already been charged for a predetermined time but has not reached a set value, and a display device displays that an abnormal state has occurred, thereby enabling the charger device to achieve the objective of providing good charging effectiveness and functionality to detect abnormalities when connecting to a battery.

4 Claims, 4 Drawing Sheets

CHARGER STRUCTURE WITH NORMAL AND BOOSTING CHARGE MODES

BACKGROUND OF THE INVENTION (a) Field of the Invention

The present invention provides an improved structure for a charger that uses a detector device to determine size of battery charge current, so that when the charge current has not yet reached a set value, then an automatic switching device switches the charger device to a boosting charge mode.

(b) Description of the Prior Art

A prior art charger connected to a battery has the function to cut off charging when the battery is fully charged. However, set values of prior art chargers are all set to voltage values of charge currents required by the normal internal resistance of batteries using the formula: $V=I \times R$ (Ohm's Law, where V=voltage, I=current, R=resistance). When the battery discharges to a voltage below one fifth of normal voltage, then it is referred to as an overdischarged battery, at which time, chemical transformation interior of the battery causes internal resistance of the battery to increase, and current is unable to flow into the battery, thereby prohibiting normal charging of the battery. Moreover, when voltage set values of the chargers are fixed to voltage values of the charge current required by normal internal resistance of batteries, then the charge current decreases when internal resistance of the batteries increases, even to the extent of no current flowing. Furthermore, when charge current decreases, many of the prior art chargers mistakenly assume the battery to be fully charged and cut off power, thus, the battery is unable to be charged or the battery is mistakenly assumed to be malfunctioning. Hence, if it is desired to resolve the problem of an overdischarged battery being unable to be charged, then the voltage set value must be increased to enable the current to produce a chemical transformation in the battery and restore a normal internal resistance, thereby achieving the objective of being able to charge the battery. However, the charge voltage cannot be set to be continuously at a high value, otherwise overcharging of the battery results. Hence, a control circuit must be used as additional control, so that when the charge current reaches a certain set value, then the charge voltage set value must restore a normal charge mode, thus, objective of charging the overdischarged battery can be achieved by increasing voltage set values of the charger.

Hence, the inventor of the present invention proposes to resolve and surmount existent technical difficulties to eliminate the aforementioned shortcomings of prior art.

SUMMARY OF THE INVENTION

A primary objective of the present invention is to provide an improved structure for a charger, wherein a detector device is used to determine size of charge current. When the charge current of the battery has not reached a set value, then an automatic switching device switches the charger to a boosting charge mode, thereby indicating that internal resistance value of the battery is very large, possibly signally that the battery has become old, or possibly because the battery is overdischarged, and a chemical transformation is produced within the battery that increases internal resistance of the battery. Furthermore, when the charge current of the battery is greater than the set value, then this indicates that internal resistance of the battery has already decreased, and normal internal resistance is gradually restored, whereupon the automatic switching device switches the charger to a normal charge mode. The charger device stops charging if the battery has already been charged for a predetermined time but has not reached a set value, and a display device displays that an abnormal state has occurred, thereby enabling the charger device to achieve the objective of providing good charging effectiveness and functionality to detect abnormalities when connected to a battery.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
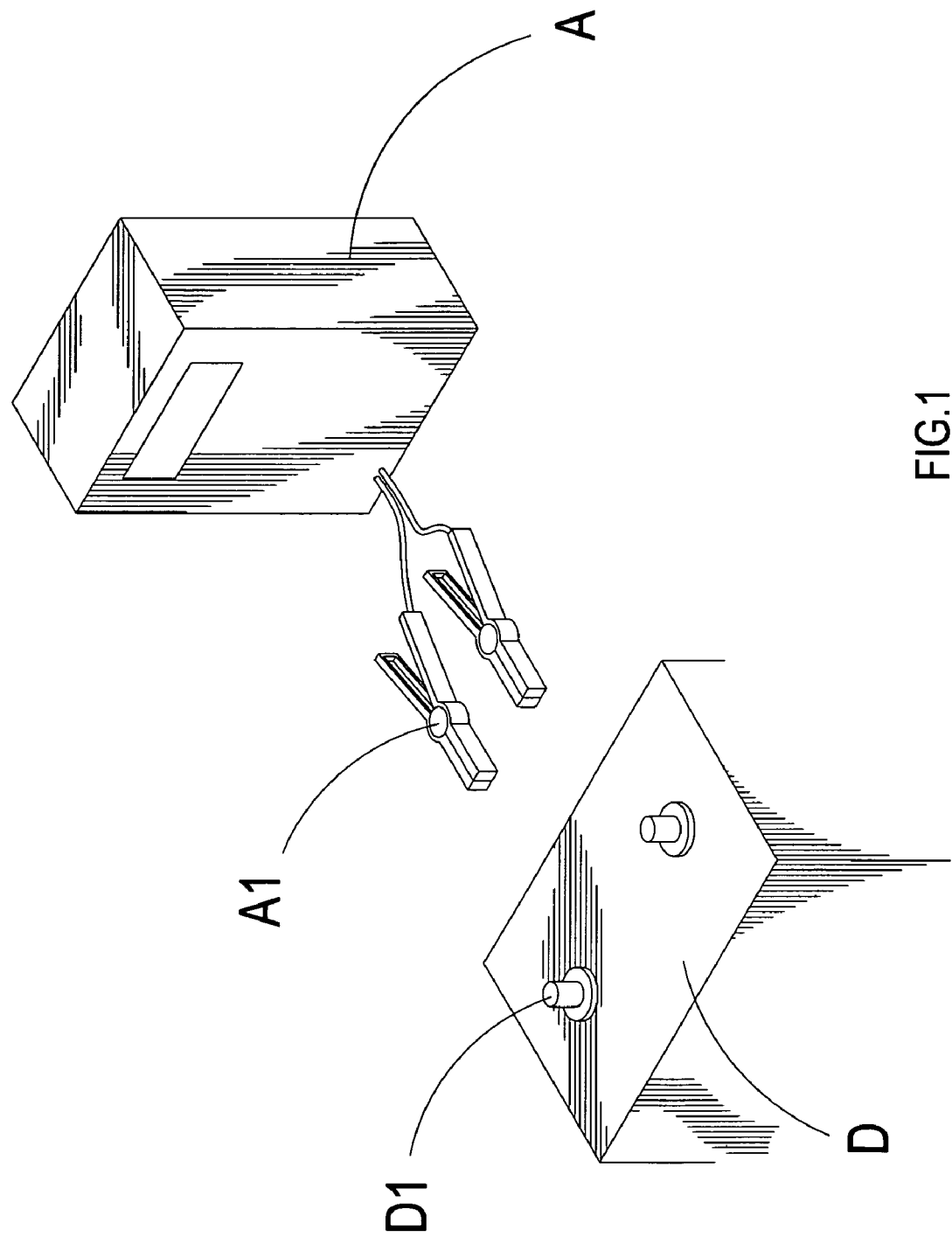
FIG. 1 shows an elevational view according to the present invention.
Figure 2:
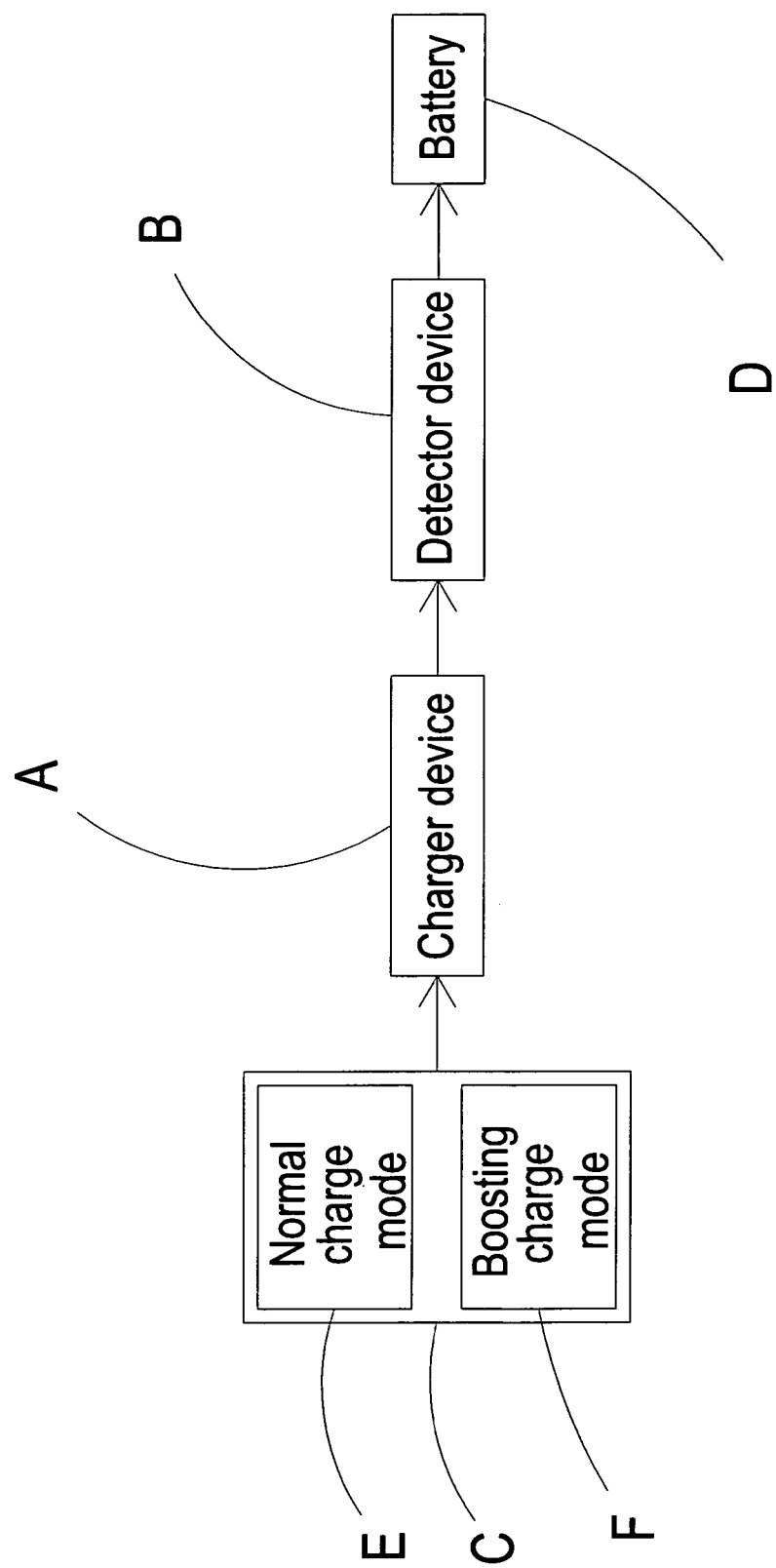
FIG. 2 shows a block diagram according to the present invention.
Figure 3:
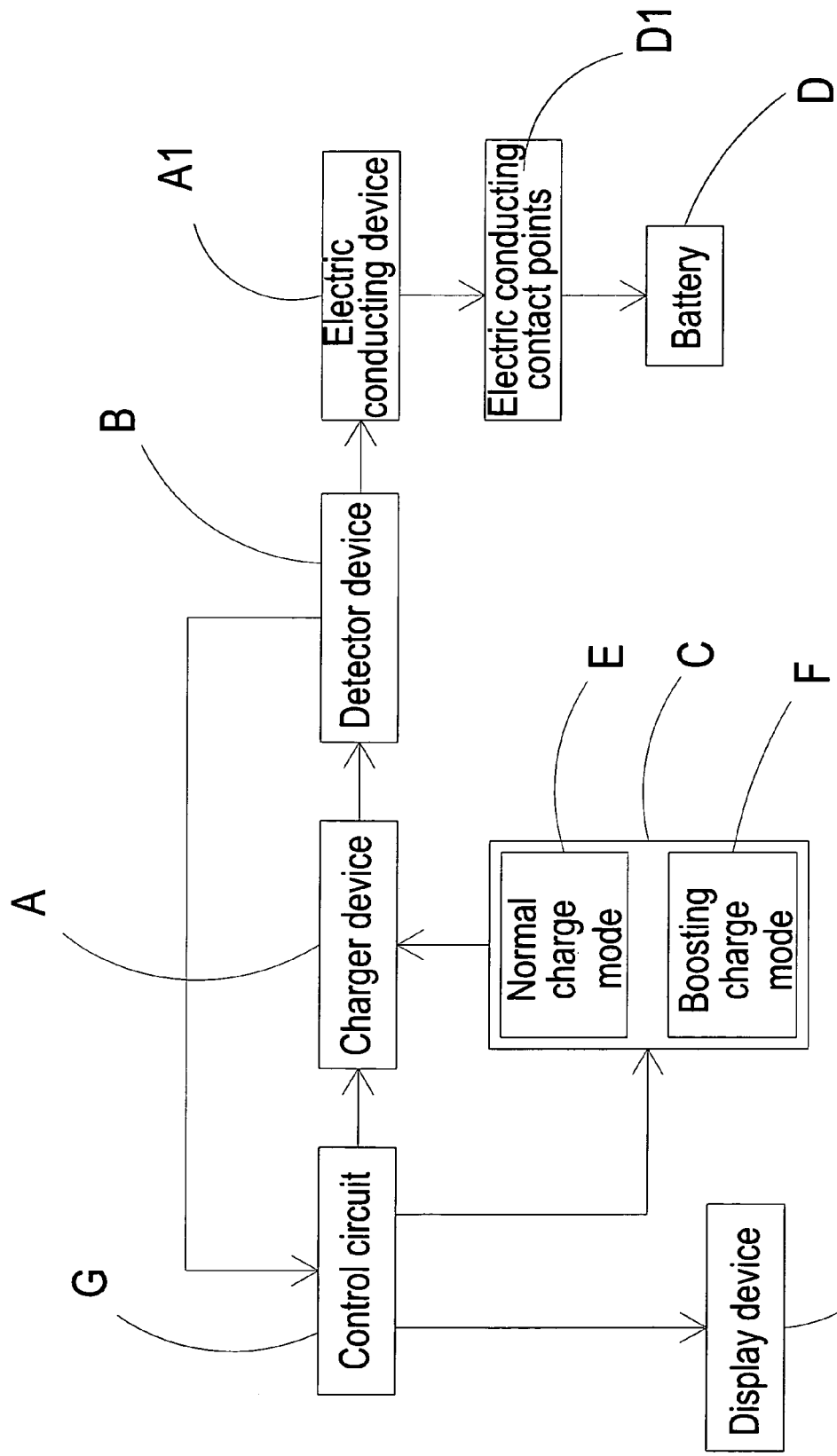
FIG. 3 shows a schematic view according to the present invention.

Referring to FIGS. 1, 2 and 3, wherein a charger device A of an improved structure for a charger of the present invention provides comprises a detector device B, an automatic switching device C and a battery D. The present invention is characterized in that:

Electric conducting devices A1 of the charger device A connect to corresponding electric conducting contact points D1 of the battery D, thereby enabling charging of the battery D to be carried out. Moreover, the electric conducting contact points D1 are correspondingly associated with the charger device A, the detector device B and the automatic switching device C.

When the charger device A is connected to and charging the battery D, size of charge current of the battery D is detected through the detector device B of the charger device A connected to the electric conducting contact points D1 using the electric conducting devices A1

When the detector device B determines that the charge current has not yet reached a set value, then the automatic switching device C switches a normal charge mode E to a boosting charge mode F, thereby enabling the charger device A to implement charging of the battery D that is overdischarged.

Furthermore, when the charge current of the battery D is greater than the set time value, the automatic switching device C switches the boosting charge mode F to the normal charge mode E. If the overdischarged battery D has undergone charging for a predetermined time and not reached the set time value, then the detector device B of the charger device A stops the charging operation.

When the detector device B of the charger device A stops the charging operation of the battery D, then a display device A2 simultaneously indicates abnormality in the battery D, thereby enabling the charger device A to achieve the objective of providing good charging effectiveness and functionality to detect abnormalities when connected to and charging the battery D.

Figure 4:
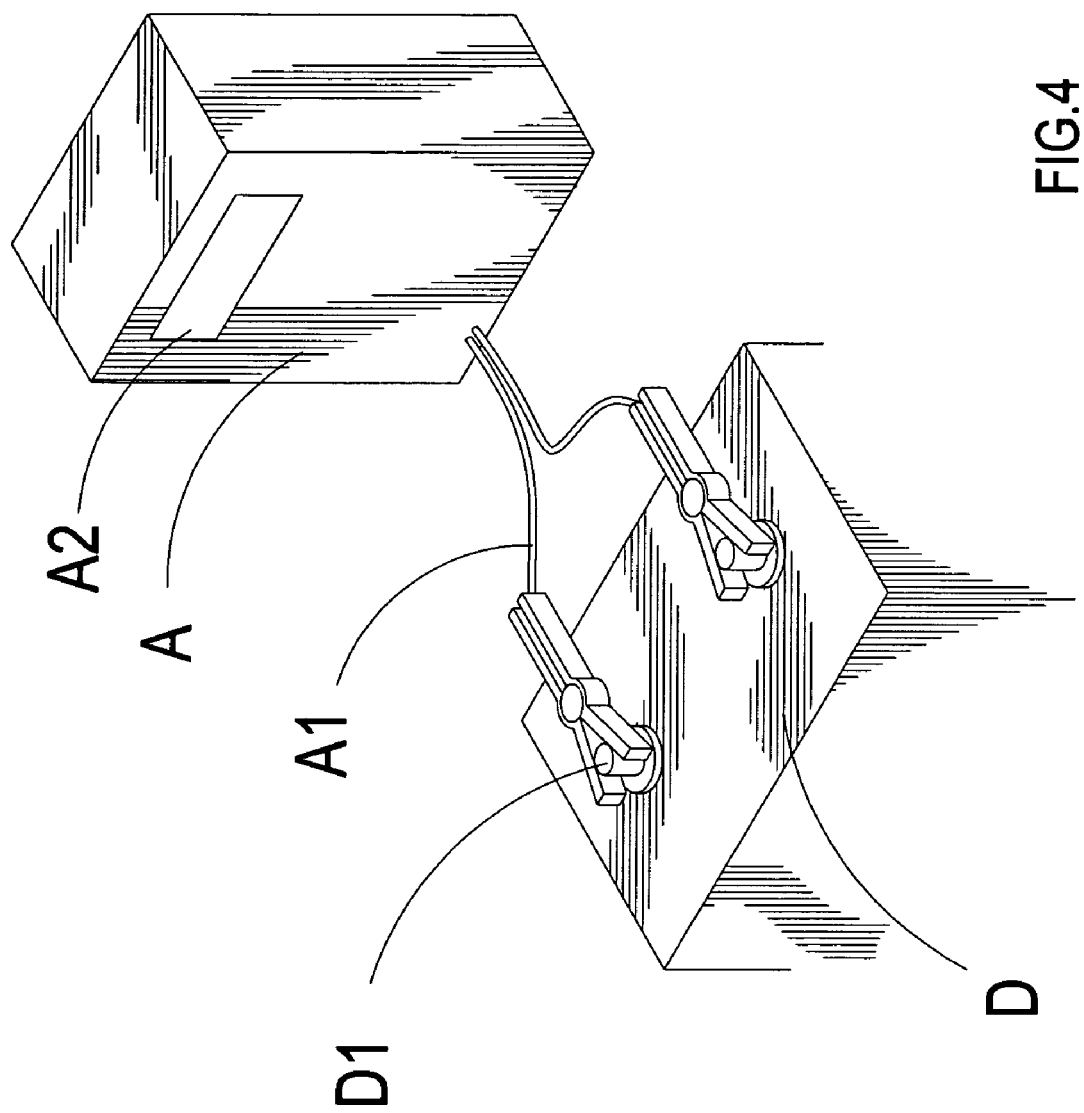
FIG. 4 shows a schematic view of an embodiment according to the present invention.

Referring to FIGS. 3 and 4, which show an embodiment of the present invention, wherein when the charger device A is connected to and charging the battery D, then the detector device B of the charger device A is able to detect charge current size of the battery D through the electric conducting devices A1 of the charger device A connected to the battery D.

When the detector device B determines that charge current of the battery D has not reached the set value, then the normal charge mode E is switched to the boosting charge mode F by means of a control circuit G and the automatic switching device C.

Furthermore, when the detector device B detects that the charge current of the battery D is greater than the set value, then the automatic switching device C switches the boosting charge mode F to the normal charge mode E. If the battery D has already been charged for a predetermined time but has not reached the set value, then the detector device B stops the charging operation of the battery D, and a display device A2 displays that the battery D is an abnormal state, thereby enabling the charger device A to achieve the objective of providing good charging effectiveness and functionality to detect abnormalities when connected to and charging the battery D.

The charger device A comprises the positive and negative pole electric conducting devices A1 corresponding to the electric conducting contact points D1 of the battery D. When the battery D that is overdischarged is connected to the charger device A and charging, the charger device A, the detector device B and the automatic switching device C enable achieving the objective of providing good charging effectiveness and functionality to detect abnormalities in the battery D.

The boosting charge mode F can be set to be 1.2 to 2.5 times the voltage value of the normal charge mode E, thereby enabling the normal charge mode E and the boosting charge mode F of the charger device A to achieve the objective of providing good charging effectiveness and functionality to detect abnormalities when the battery D is connected to the charger device A having the built-in detector device B and automatic switching device C.

In order to better explicitly disclose advancement and practicability of the present invention, a comparison with prior art is described hereinafter:

Shortcomings of Prior Art

1. Set values of prior art chargers are all set to voltage values of charge currents required by the normal internal resistance of batteries. When the battery discharges to a voltage below one fifth of normal voltage, then it is referred to as an overdischarged battery, at which time, internal resistance of the battery increases and the charge current decreases, even to the extent of no current at all. Furthermore, when the charge current decreases, many of the prior art chargers will mistakenly assume that the battery is fully charged and cut the power, thus, the battery is unable to be charged or the battery is mistakenly assumed to be malfunctioning, resulting in resource wastage.

Advantages of the Present Invention

1. The built-in detector device B and automatic switching device C of the charger device A, along with the control circuit G determine whether to select the normal charge mode E or the boosting charge mode F appropriate to when the charge current is greater than or smaller than the set value, thereby achieving the objective of providing good charging effectiveness.

2. According to the first advantage, an overdischarged battery causing an increased internal resistance will not result in the battery being unable to be charged or mistakenly assuming the battery to be malfunctioning. Moreover, the boosting charge mode F produces a chemical transformation in the battery that restores a normal internal resistance value to the battery, thereby enabling achieving the objective of charging the battery, which avoids unwanted resource wastage and environmental problems.

3. Provided with advancement and practicability.

4. Enhances commercial competitiveness.

In conclusion, the present invention in overcoming structural shortcomings of prior art has assuredly achieved effectiveness of anticipated advancement, and, moreover, is easily understood by persons unfamiliar with related art. Furthermore, contents of the present invention have not been publicly disclosed prior to this application, and practicability and advancement of the present invention clearly comply with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A charger structure comprising a charger device that comprises a detector device, a control circuit, a normal charge mode and a boosting charge mode, wherein the charger device has a built-in detector device, and the detector device is correspondingly connected to a battery; when the charger device is correspondingly connected to and charging the battery, then the detector device determines size of charge current and voltage; when the detector device determines that the battery is over-discharged based on the charge current and voltage having not reached set values after conducting a normal charging mode, then the control circuit sets the charger device to operate in the boosting charge mode to charge the over-discharged battery, wherein the boosting charge mode is set to be 1.2 to 2.5 times the voltage value of the normal charge mode.

2. The charger structure according to claim 1, wherein the detector device is configured as a current detector device and a voltage detector device.

3. The charger structure according to claim 1, wherein the charger device is configured with a display device, thereby achieving the objective of enabling a user to accessibly understand charge status and battery condition.

4. The charger structure according to claim 1, wherein the boosting charge mode produces a chemical transformation in the battery that restores a normal internal resistance value to the battery.

* * * * *